(12) United States Patent
Jank et al.

(10) Patent No.: US 12,715,439 B2
(45) Date of Patent: Aug. 25, 2026

(54) METHOD AND DRIVER ASSISTANCE SYSTEM FOR ASSISTED REVERSING WITH A VEHICLE-TRAILER COMBINATION AND MOTOR VEHICLE

(71) Applicant: Volkswagen Aktiengesellschaft, Wolfsburg (DE)

(72) Inventors: Dennis Jank, Hannover (DE); Philipp Hüger, Rühen (DE); Viktor Bradar, Štenovice (CZ); Dennis Imroth, Schandelah (DE); Havlík Jindrich, Plzen (CZ); Fehér Marek, Horní Bríza (CZ); Petr Batek, Plzen (CZ)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 155 days.

(21) Appl. No.: 18/765,782

(22) Filed: Jul. 8, 2024

(65) Prior Publication Data

US 2025/0026350 A1 Jan. 23, 2025

(30) Foreign Application Priority Data

Jul. 18, 2023 (DE) .................... 10 2023 206 800.1

(51) Int. Cl.

| | |
|---|---|
| ***B60W 30/18*** | (2012.01) |
| ***B60W 10/20*** | (2006.01) |
| ***B60W 30/09*** | (2012.01) |

(52) U.S. Cl.

CPC ...... *B60W 30/18036* (2013.01); *B60W 10/20* (2013.01); *B60W 30/09* (2013.01);

(Continued)

(58) Field of Classification Search

CPC ........... B60W 30/18036; B60W 10/20; B60W 30/09; B60W 2300/14; B60W 2520/06;

(Continued)

(56) References Cited

U.S. PATENT DOCUMENTS

| | | | |
|---|---|---|---|
| 9,164,955 | B2 | 10/2015 | Lavoie et al. |
| 10,775,805 | B2 | 9/2020 | Thode |

(Continued)

FOREIGN PATENT DOCUMENTS

| | | | | |
|---|---|---|---|---|
| DE | 102015220646 A1 | 4/2017 | ............ | B60W 30/08 |
| DE | 102017200218 A1 | 7/2018 | ............ | B60W 30/06 |

(Continued)

OTHER PUBLICATIONS

German Office Action, Application No. 102023206800.1, 8 pages, Mar. 7, 2024.

*Primary Examiner* — Yi-Kai Wang
(74) *Attorney, Agent, or Firm* — Slayden Grubert Beard PLLC

(57) ABSTRACT

The disclosure relates to a method and a driver assistance system for assisted reversing with a vehicle-trailer combination, wherein it is initially driven forwards, wherein a corresponding forward trajectory is stored and, by means of a sensor system of the towing vehicle, objects arranged laterally next to the forward trajectory are detected. A reversing trajectory, which deviates as little as possible from the driven forward trajectory, and, for each vehicle of the trailer, a vehicle-specific reversing corridor corresponding to the planned reversing trajectory are planned. The detected object in each case is classified as a collision object if it lies in at least one of the planned reversing corridors. In such a case, a new reversing trajectory and, for each vehicle, a new reversing corridor that is free of collision objects is gener- (Continued)

ated. The trailer is then reversed along the new reversing trajectory with the aid of the driver assistance system.

15 Claims, 6 Drawing Sheets

(52) U.S. Cl.
CPC ..... *B60W 2300/14* (2013.01); *B60W 2520/06* (2013.01); *B60W 2554/80* (2020.02); *B60W 2720/24* (2013.01)

(58) Field of Classification Search
CPC ......... B60W 2554/80; B60W 2720/24; B60W 30/06; B60W 30/095; B60W 2552/50; B62D 13/06; B62D 15/0285; G08G 1/165; G08G 1/168
USPC ............................................................ 701/41
See application file for complete search history.

(56) References Cited

U.S. PATENT DOCUMENTS

| | | | | |
|---|---|---|---|---|
| 11,397,438 | B2 | 7/2022 | Lacaze et al. | |
| 2019/0071069 | A1* | 3/2019 | Nordbruch | B60W 30/06 |
| 2020/0180691 | A1* | 6/2020 | Sandblom | B60W 30/18036 |
| 2021/0403032 | A1 | 12/2021 | Jing et al. | |
| 2022/0333949 | A1 | 10/2022 | Persson | |
| 2023/0249675 | A1* | 8/2023 | Prinzhausen | B60W 60/0011 701/41 |

FOREIGN PATENT DOCUMENTS

| | | | | |
|---|---|---|---|---|
| DE | 102017219876 | A1 | 7/2018 | B60W 10/20 |
| DE | 102018212060 | A1 | 1/2020 | B60W 30/06 |
| DE | 102019123855 | A1 | 3/2021 | B60W 30/08 |
| EP | 3344519 | B1 | 6/2020 | B62D 13/06 |
| KR | 20230021730 | A | 2/2023 | B60W 30/06 |

* cited by examiner

METHOD AND DRIVER ASSISTANCE SYSTEM FOR ASSISTED REVERSING WITH A VEHICLE-TRAILER COMBINATION AND MOTOR VEHICLE

CROSS-REFERENCE TO RELATED APPLICATIONS

This application claims priority to German Patent Application No. DE 10 2023 206 800.1, filed on Jul. 18, 2023 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The present disclosure relates to a method for assisted reversing with a trailer having a towing vehicle and a trailer vehicle coupled to the towing vehicle as well as a driver assistance system.

Reversing with a vehicle-trailer combination, to the towing vehicle of which a trailer is coupled, is often difficult for inexperienced drivers. Therefore, in modern motor vehicles today, assistance systems are offered more and more often to support the driver when reversing with a trailer vehicle. When driving forwards, the steering axle is the front-most of the axles of the trailer when viewed in the direction of travel, and the trailer vehicle is pulled. However, when reversing, the steering axle of the trailer is the rear-most axle of the trailer when viewed in the direction of travel, and the trailer vehicle is pushed. The trailer vehicle usually has a rigid axle, which forms the first axle of the trailer when reversing with the trailer. The pushing towing vehicle must therefore drive a driving corridor which swings out farther when reversing with the trailer in order to expediently steer the coupled trailer vehicle, because it is harder to steer due to its rigid axle. Therefore, this results in driving trajectories for the towing vehicle and for the trailer vehicle for driving forwards that each differ from the driving trajectories for reversing. It is often necessary to drive a path that has just been driven forwards with the trailer as exactly as possible backwards, for instance in order to let oncoming traffic pass at a bottleneck or to exit a narrow entry to a dead end backwards. But due to the different driving trajectories, it can occur that when driving forwards along the forward trajectory, objects are driven past that lie in the reversing trajectory as obstacles when reversing. There is therefore a need for a system that solves this problem.

No conventional method considers the problem that reversing with a trailer vehicle requires driving corridors for the pushing towing vehicle that swing farther out in order to expediently steer the coupled trailer vehicle. If sensors are used in the conventional method, they must be provided on the trailer vehicle, which means trailers with simple, sensorless trailer vehicles are excluded from the conventional method. Because it must be considered that a reversing sensor system of the towing vehicle is covered by the trailer vehicle, such that the reversing sensor system of the towing vehicle does not deliver reliable data.

SUMMARY

A need exists to provide an assisted reversing with a vehicle-trailer combination that is particularly reliable and effortless for a driver.

The need is addressed by the subject matter of the independent claim(s). Embodiments of the invention are described in the dependent claims, the following description, and the drawings.

DESCRIPTION

Figure 1:
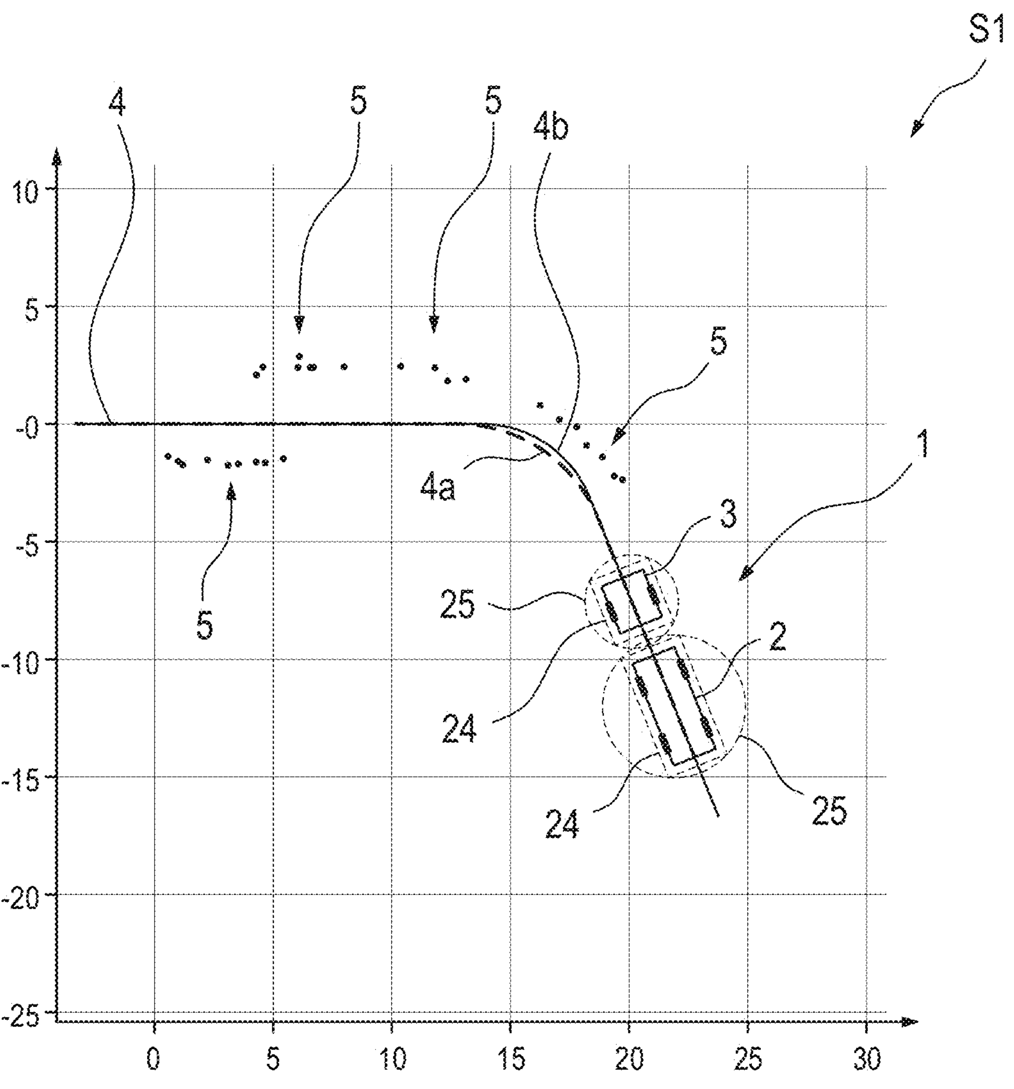
FIG. 1 shows a schematic plan view of an example vehicle-trailer combination when driving forwards.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for assisted reversing with a vehicle-trailer combination is proposed. The vehicle-trailer combination is referred to herein simply as a trailer and comprises a towing vehicle and a trailer vehicle coupled to the towing vehicle by means of a trailer coupling. One of the vehicles is equipped with a driver assistance system, which is configured to perform the method and is also part of the disclosure according to some embodiments. In some embodiments, the towing vehicle has the driver assistance system. It is conceivable that the trailer has the driver assistance system such that one or some driver assistance system modules of the driver assistance system is/are arranged on board the towing vehicle and one or some of the driver assistance system modules or circuits or processors of the same driver assistance system are arranged on board the trailer vehicle. Alternatively or additionally and in some embodiments, it is conceivable that one or some of the driver assistance system modules/circuits/processors of the same driver assistance system is/are designed externally of the trailer, for example, as part of a distributed, coupled driver assistance system. Furthermore, a motor vehicle, in particular a passenger car, is proposed in some embodiments, which has the driver assistance system and may be configured to function as the towing vehicle for the trailer.

The method may in some embodiments be a computer-implementable method, which means that at least some of the steps of the method discussed in more detail in the following can be performed by means of a computer configured for electronic data processing. In this case, the teachings herein propose both a computer program and a computer-readable storage medium, on which the computer program is stored. Upon execution of its program commands by a computer, the computer program causes said computer to perform the method for assisted reversing with the vehicle-trailer combination. The computer may for example be a part of the driver assistance system or one of a group of the driver assistance system modules, optionally in combination with the trailer-external computer. The disclosure also proposes a computer program that, upon execution of its program commands by the computer or, respectively, the driver assistance system, causes said computer or, respectively, said driver assistance system to perform the method for assisted reversing with the vehicle-trailer combination. The driver assistance system modules explained in the following can thus be software modules or, respectively, program modules of the computer program. Solutions in software, hardware, and combinations thereof are conceivable.

In some embodiments of the method for assisted reversing with the trailer, in a step S1 of the method, the trailer is initially driven forward assisted or unassisted-meaning manually, purely by the human driver, or assisted completely or partially by a driver assistance system. A corresponding forward trajectory of the trailer is stored in the driver assistance system, for example, in a trajectory memory of the driver assistance system, which in some embodiments is designed as a ring memory. The forward trajectory of the trailer has a forward trajectory of the towing vehicle and a forward trajectory of the trailer vehicle; however, since they hardly deviate from each other when the trailer is driven forwards—in contrast to when the trailer is reversed—they are assumed to be the same in good approximation. By means of a sensor system of the towing vehicle, objects arranged laterally next to the forward trajectory are detected while driving forwards. The sensor system has, for example, ultrasonic, laser, radar, lidar, infrared, and/or camera sensors. Sensor data that is/was gathered by means of the sensor system and that characterizes objects next to the forward trajectory are provided to the driver assistance system, in particular as a point cloud. Positions of the objects are thus stored, for example, in an object memory of the driver assistance system. During or after termination of forward travel and in some embodiments, a reversing trajectory for the trailer and corresponding vehicle-specific reversing corridors are planned in a step S2, for example by means of a reversing trajectory generation module of the driver assistance system. The reversing trajectory of the trailer or, respectively, for the trailer is planned in this case such that it deviates as little as possible from the driven forward trajectory. The forward trajectory thus functions as a reference trajectory for the upcoming reversing. The vehicle-specific reversing corridors corresponding to the reversing trajectory of the trailer are planned separately for each vehicle of the trailer. Thus, a reversing corridor is planned for the towing vehicle, and a separate reversing corridor is planned for the trailer vehicle. In some embodiments and a step S3, a classification of the detected objects takes place, for instance by means of an object classification module of the driver assistance system. The object detected in each case is classified as a collision object if the corresponding object lies in one or both of the planned reversing corridors. It possible, however, that the object detected in each case is classified as a non-collision object if it does not lie in any of the reversing corridors when reversing with the trailer. In some embodiments and a step S4, if one or more of the detected objects has been classified as a collision object, a new reversing trajectory is generated for the trailer and, as a result, a separate new vehicle-specific reversing corridor is generated for each vehicle by means of the reversing trajectory generation module. The new vehicle-specific reversing corridor is generated in each case such that it deviates as little as possible from the reversing corridor planned in each case in step S2. The two new reversing corridors are, however, generated in any case such that the detected objects classified as collision objects now do not lie in any of the new vehicle-specific reversing corridors. In some embodiments and a step S5, the trailer is reversed in a reversing assistance operating mode, which is performed, for example, by means of a vehicle control module of the driver assistance system, wherein the driver assistance system, in particular its vehicle control module, intervenes in transverse guidance of the towing vehicle at least such that the trailer is driven along the new reversing trajectory and, as a result, through the new vehicle-specific reversing corridors. The driver assistance system can be switched, for example, into the reversing assistance operating mode in that a driver of the towing vehicle makes a corresponding input to the driver assistance system, for instance issues a speech command or presses a button, etc. By activating the reversing assistance operating mode, in particular the vehicle control module of the driver assistance system is switched into active or, respectively, assisting operation.

In the method or, respectively, by means of the driver assistance system, when the trailer is driven forwards, its driven forward trajectory may in some embodiments be recorded. The driver can drive in this case in practically any way—the driven trajectory can be recorded, for example, continuously in the ring memory of the driver assistance system. For example, the trajectory is always stored for a specified driving path length that has been completed, for example, for the last 100 m, etc. Thanks to the example method, a problem that an object that was driven past without a collision while driving forward can lead to a collision with the trailer when reversing along the forward trajectory is solved. Furthermore, the method includes all possible trailer vehicles, since they do not need to have any special equipment/gear. Because during the assisted reversing, the driver assistance system is not (no longer) dependent on sensors of the trailer, since the reversing trajectory to be driven has already been detected by sensors during the preceding forwards driving. Rear sensors of the towing vehicle are often deactivated anyway during operation with a trailer vehicle to ensure that the driver is not provided with incorrect information. It is conceivable in some embodiments in particular that the method uses a static map, on the basis of which the driver assistance system intervenes in the transverse guidance of the towing vehicle. It is also conceivable that the driver is warned by means of the driver assistance system when it determines that the planned reversing cannot be performed. It is understood that geometric properties of the towing and trailer vehicles must be provided to the driver assistance system in advance in order to perform the method. For example, the user can write in dimensions of the trailer vehicle into the driver assistance system via a human-machine interface. Furthermore, it can be provided that the user also inputs dimensions of the towing vehicle into the driver assistance system, for instance when the towing vehicle deviates from its standard dimensions due to additional equipment or load.

In some embodiments, it is provided that, when reversing, the entire new reversing trajectory is driven along and, as a result, the new vehicle-specific reversing corridors are driven through in one go, meaning without a forward correction. In other words, the new reversing trajectory or, respectively, the reversing corridors are planned such that no forward correction is necessary. If it should occur that the reversing cannot be performed or cannot be continued without a forward correction, it is provided in particular in the method that the assistance is canceled and the control of the trailer is (once again) transferred completely to the human driver or the reversing assistance operating mode is not activated in the first place-optionally with the output of a notice to the driver.

In some embodiments, it is provided that the driver assistance system completely takes over the transverse guidance of the towing vehicle and/or longitudinal guidance of the towing vehicle in step S5. This completely removes the human driver as a possible source of error from the control of the trailer when reversing with the trailer. This ensures, for example, that the driver completes the reversing too quickly, which could impair driving stability.

In some embodiments, one (first) imaginary collision rectangle is specified to the driver assistance system for each vehicle of the trailer, which rectangle completely encloses the corresponding vehicle and moves along with the vehicle. It is provided here that a geometric center of area of the collision rectangle lies on a longitudinal center axis (X-axis) of the vehicle. A transverse axis (Y-axis) of the vehicle and a transverse axis of the collision rectangle are also arranged at least parallel to each other. The collision rectangle is specified for each vehicle in particular such that an outer contour of the associated vehicle and the edges of the collision rectangle are spaced apart from each other by a first safety distance, which is less than 75 cm, for example less than 50 cm, in particular 25 cm. An imaginary circle is also specified to the driver assistance system for each vehicle of the trailer, on which circle the vertices of the associated collision rectangle always lie. The circle, like the collision rectangle, thus moves along with the corresponding vehicle when it is moved. In these embodiments, it is also provided that the detected objects are each classified, for example, by means of the object classification module of the driver assistance system, as a critical object if the corresponding object is intersected by one or both circles during forward travel. It is possible, on the other hand, that the detected object in each case is classified as a non-critical object if the corresponding object is not intersected by either of the circles of the vehicles when driving past. Then, in step S3 of the method, only those of the detected objects that would be intersected by the collision rectangle during reversing assisted by means of the driver assistance system are each classified as a collision object. In this way, computing power can be reduced, since the number of objects to be classified is lower than in the case that all objects detected by means of the sensor system would be classified, wherein this then includes objects that are irrelevant for planning collision-free reversing.

In conjunction with the collision rectangle, it is provided in some embodiments that a second imaginary collision rectangle, which lies completely within the first collision rectangle, and a third imaginary collision rectangle, which lies completely within the second collision rectangle, are specified for each vehicle. In particular, the collision rectangles are concentric to each other, meaning they share a common center of area, which lies on the longitudinal center axis of the vehicle. In some embodiments, the edges of the first collision rectangle and the outer contour of the associated vehicle are spaced apart from each other by the first safety distance, which is, for example, 75 cm. The edges of the second collision rectangle and the edges of the first collision rectangle are spaced apart from each other, for example, by 25 cm, as a result of which the edges of the second collision rectangle and the outer contour of the associated vehicle are spaced apart from each other by a second safety distance of 50 cm. Furthermore, the edges of the third collision rectangle and the edges of the second collision rectangle are spaced apart from each other, for example, by 25 cm, as a result of which the edges of the third collision rectangle and the outer contour of the associated vehicle are spaced apart from each other by a third safety distance of 25 cm. This is to be understood only as one possible example: other distances between the edges of the collision rectangles or, respectively, between the collision rectangles and the outer contour of the associated vehicle are of course possible. In this case, when reversing assisted by means of the driver assistance system, the collision object in each case is classified, for instance by means of the object classification module, as a notice object as long as the corresponding collision object is intersected by the first collision rectangle but not by the second collision rectangle or by the third collision rectangle. In response to the notice object, a notice action is performed by means of the driver assistance system. For example, it is communicated to the driver that the trailer is approaching the collision object and/or a driving speed of the trailer is reduced and/or the complete or partial resumption of control of the trailer is offered to the driver. Further, the collision object in each case is classified during assisted reversing as a warning object as long as the corresponding collision object is intersected by the first collision rectangle and by the second collision rectangle but not by the third collision rectangle, wherein a warning action is performed by means of the driver assistance system in response to the warning object. For example, it is communicated to the driver that the trailer is in danger of a collision and/or a driving speed of the trailer is reduced further/more and/or the complete resumption of control of the trailer is recommended to the driver with high urgency. If the collision object enters the innermost of the collision rectangles, meaning the third collision rectangle, a collision emergency action can be performed. For example, it is communicated to the driver that a collision is immediately imminent and/or the trailer is completely stopped and/or the control of the trailer is once again given completely to the driver. In this way, a three-stage warning system can be easily implemented, by means of which it is enabled to more clearly inform the driver of the trailer about potential risks and/or, in the case of automatic braking, to brake gradually before the driver is surprised by emergency braking.

To plan or, respectively, generate the new reversing trajectories or, respectively, the new vehicle-specific reversing corridors, a further possible embodiment provides that departing from the initially planned reversing trajectory is planned. For this purpose, a perpendicular, which intersects the outer contour point, to the tangent of the reversing trajectory is positioned at a problem point of the reversing trajectory initially planned in step S2, at which the reversing trajectory and the outer contour point of a collision object are spaced apart from each other by a minimum distance. In this case, those of the tangents of the reversing trajectory that branch off from the reversing trajectory at the problem point are used. On a side of the reversing trajectory lying opposite the outer contour point, a new planning point is then placed as a straight-line extension of the perpendicular, wherein a trajectory offset distance is formed between the initially planned reversing trajectory and the new planning point. Said distance is in any case greater than zero, but is nevertheless selected such that it is as close as possible to the initially planned reversing trajectory. It is selected—at least during the first planning of the departure—at most as long as the driver assistance system assesses that it is possible in a first approximation for the trailer to pass the problem point without a collision. In particular, the trajectory offset distance is limited by a sensor range of the sensor system of the towing vehicle, which sensor range is approximately four meters in each case perpendicularly and laterally to the corresponding trajectory that is driven with the towing vehicle. In other words, the new planning point is arranged at most on a lateral outer limit of the sensor range of the sensor system of the towing vehicle. For example, the trajectory offset distance is at most four meters when the perpendicular-lateral sensor range of the sensor system is four meters. On the initially planned reversing trajectory, a departure point is then determined, which lies, with reference to the reversing direction, before the problem point on the initially planned reversing trajectory. This means that, if the reversing trajectory continued to be driven, the trailer would first reach the departure point and then the problem point. In step S4, a new reversing trajectory portion and, as a result, new vehicle-specific reversing corridor portions for each vehicle for departing from the initially planned reversing trajectory are planned, for example, by means of the reversing trajectory generation module, between the departure point and the new planning point.

If it is determined when planning the new vehicle-specific reversing corridor portions or, respectively, the new reversing trajectory portion for departing from the initially planned reversing trajectory that driving these new reversing corridor portions would lead to a secondary collision, it is provided in some embodiments that planning the new vehicle-specific reversing corridor portions for departing from the initially planned reversing trajectory is restarted or, respectively, repeated. A secondary collision is, for example, a collision with another of the detected objects or with the same object but with a different vehicle of the trailer, or with the correspondingly other of the vehicles of the trailer. Such a secondary collision becomes relevant only when the planning of the departure from the initially planned reversing trajectory has been performed at least once. The repeated planning then takes place on the basis that the new planning point is spaced apart from the initially planned reversing trajectory by a greater trajectory offset distance than during the first pass in order to also avoid the secondary collision. The new planning point is thus shifted farther in the direction of the sensor range limit of the sensor system, but in this case also not past it. This repeated planning may be necessary, for example, if, according to the first planning, the trailer vehicle could be steered without a collision along the associated new reversing corridor portion, but to do so the towing vehicle had to deviate further from the initially planned reversing trajectory and as a result would collide with one of the detected objects. Alternatively or additionally and in some embodiments, it can be provided that the repeated planning takes place on the basis of a departure point lying closer to the trailer, such that steering of the towing vehicle that swings out in a less pronounced manner is sufficient to drive around the relevant collision point with the trailer.

In some embodiments, returning to the initially planned reversing trajectory is also planned. For this purpose, on the initially planned reversing trajectory, a return point is determined, which lies, with reference to the reversing direction, after the problem point on the initially planned reversing trajectory. This means that, if the reversing trajectory continued to be driven, the trailer would first reach the problem point and then the return point. In step S4, an additional new reversing trajectory portion and, as a result, additional new vehicle-specific reversing corridor portions for each vehicle for returning to the initially planned reversing trajectory are planned, for example, by means of the reversing trajectory generation module, between the new planning point and the return point.

If it is determined when planning the new vehicle-specific reversing corridor portions or, respectively, the new reversing trajectory portion for returning to the initially planned reversing trajectory that driving these new reversing corridor portions would lead to a further/another secondary collision, it is provided in some embodiments that planning the new vehicle-specific reversing corridor portions for returning to the initially planned reversing trajectory is restarted or, respectively, repeated. The further/other secondary collision becomes relevant only when the planning of the return to the initially planned reversing trajectory has been performed at least once. The repeated planning then takes place on the basis that a return point lying farther away from the trailer is determined such that steering with the towing vehicle that swings out in a less pronounced manner is sufficient to drive around the relevant collision point with the trailer. Alternatively or additionally, it can be provided that the planning of the departure from the initially planned reversing trajectory is repeated as described above and in doing so the new planning point is shifted even farther towards the sensor range limit of the sensor system. In some embodiments of the method, in planning the departure or, respectively, return, the initially planned reversing trajectory is beneficially only deviated from to a particularly small degree.

Some embodiments provide that the departure from the initially planned reversing trajectory and the return to the initially planned reversing trajectory is planned for the entire planned reversing trajectory before the driver assistance system or, respectively, its vehicle control module intervenes in the transverse guidance of the towing vehicle for the first time. In other words, a planning horizon reaches until the end of the planned reversing trajectory. This enables particularly reliable and fluid reversing assistance.

In some embodiments, the departure from the initially planned reversing trajectory is planned as soon as it is determined by means of the driver assistance system that a specified minimum planning distance between a current position of the trailer and the problem point has been reached. Returning to the initially planned reversing trajectory is planned in this case when the trailer is located on the new reversing trajectory portion. In this case, the planning horizon covers only a part of the planned reversing trajectory, as a result of which computing power required for the method can be reduced. This means the method can be performed particularly efficiently.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting.

In the following, a method for assisted reversing with a trailer 1, a driver assistance system configured to perform the method, and a motor vehicle having the driver assistance system are described together. Identical or functionally identical elements are provided with the same reference sign in the figures.

The trailer 1 is a vehicle-trailer combination having a towing vehicle 2 and a trailer vehicle 3 coupled to the towing vehicle 2 by means of a trailer coupling. One of the vehicles 2, 3, in the present case the towing vehicle 2, is equipped with a driver assistance system, which is configured to perform the method. The towing vehicle 2 is designed here as a passenger car.

In the method for assisted reversing with the trailer 1, the trailer 1 is initially driven forwards in a step S1 of the method. This is shown in FIG. 1, which shows a schematic plan view of the trailer 1 while driving forwards. A forward trajectory 4 of the trailer 1 characterizing the forward travel is stored in a trajectory memory of the driver assistance system designed as a ring memory. A forward trajectory 4*a* of the towing vehicle 2 and a forward trajectory 4*b* of the trailer vehicle 3 barely deviate from each other when the trailer 1 is driven forwards, such that they can be assumed to be the same. By means of a sensor system of the towing vehicle 2, a point cloud is detected while driving forwards, which detects objects 5 arranged laterally next to the forward trajectory 4. The point cloud detected by means of the sensor system is stored in an object memory of the driver assistance system.

Figure 2:
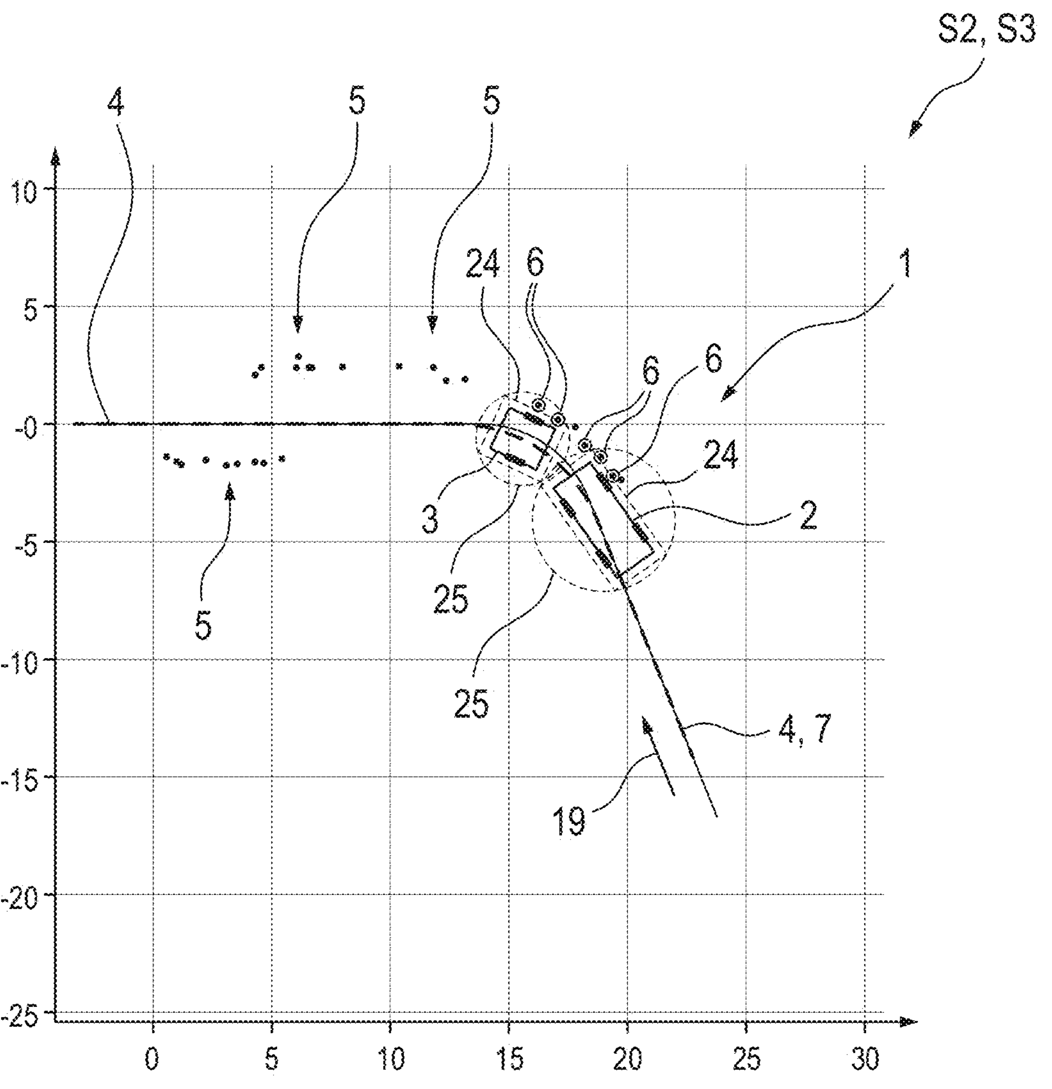
FIG. 2 shows a schematic plan view of the vehicle-trailer combination of FIG. 1 in simulated reversing, wherein objects that were detected when driving forwards are each classified as a collision object.

FIG. 2 shows a schematic plan view of the trailer 1 in simulated reversing, wherein the objects 5 that were detected when driving forwards are each classified as a collision object 6. During or after termination of forward travel, a reversing trajectory 7 for the trailer 1 and corresponding vehicle-specific reversing corridors 8, 9 (see FIG. 3) are planned for the vehicles 2, 3 in a step S2, in this example by means of a reversing trajectory generation module of the driver assistance system. The reversing trajectory 7 of the trailer 1 is planned in this case such that it deviates as little as possible from the driven forward trajectory 4. The forward trajectory 4 thus functions as a reference trajectory for the upcoming reversing. The vehicle-specific reversing corridors 8, 9 corresponding to the reversing trajectory 7 are planned separately for each vehicle 2, 3. Thus, a reversing corridor 8 for the towing vehicle 2 and a reversing corridor 9 for the trailer vehicle 3 are planned. In a step S3 of the method, a classification of the detected objects 5 takes place, in the present case by means of an object classification module of the driver assistance system. The object 5 detected in each case is classified as a collision object 6 if the corresponding object lies in one or in both of the planned reversing corridors 8, 9. For this purpose, for example, reversing along the reversing trajectory 7 initially planned in step S2 is simulated, as shown in FIG. 2.

Figure 3:
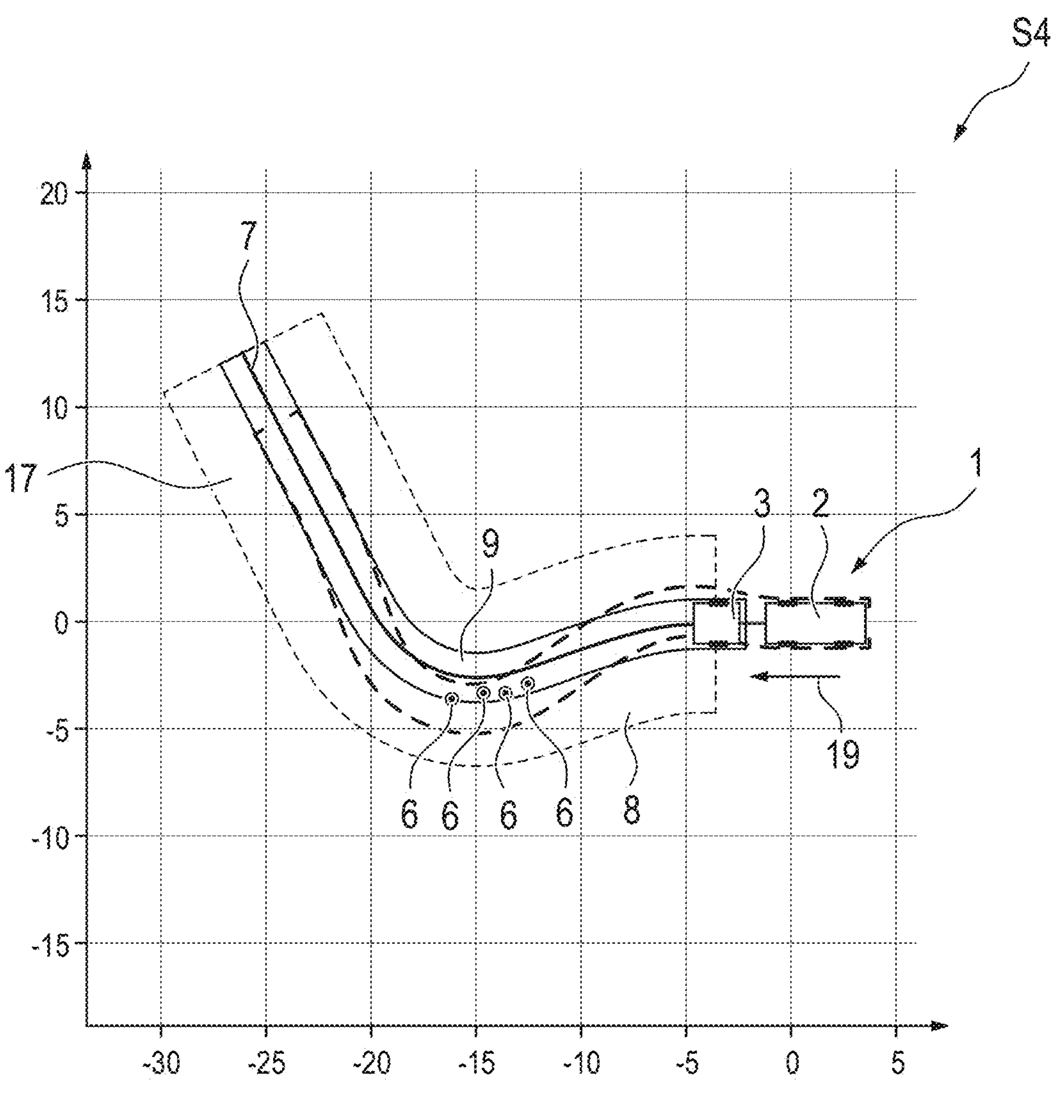
FIG. 3 shows a schematic plan view of the vehicle-trailer combination of FIG. 1 at the beginning of reversing assisted using a driver assistance system, wherein objects prevent reversing without collisions.

FIG. 3 shows a schematic plan view of the trailer 1 at the beginning of reversing assisted by means of a driver assistance system, wherein collision objects 6 initially prevent reversing of the trailer 1 without collisions. Because, as can be seen, collision objects 6 lie in the reversing corridor 9 of the trailer vehicle 3. In such a case, a step S4 of the method provides that a new reversing trajectory 7*a* (see FIG. 6) and, as a result, for each vehicle 2, 3, a new vehicle-specific reversing corridor 8*a*, 9*a* are generated in each case (see FIG. 6) by means of the reversing trajectory generation module. The new vehicle-specific reversing corridor 8*a*, 9*a* is generated in each case such that it deviates as little as possible from the reversing corridor 8, 9 planned in each case in step S2. The two new reversing corridors 8*a*, 9*a* are, however, generated in any case such that the collision objects 6 do not lie in either of the new vehicle-specific reversing corridors 8*a*, 9*a*.

Figure 4:
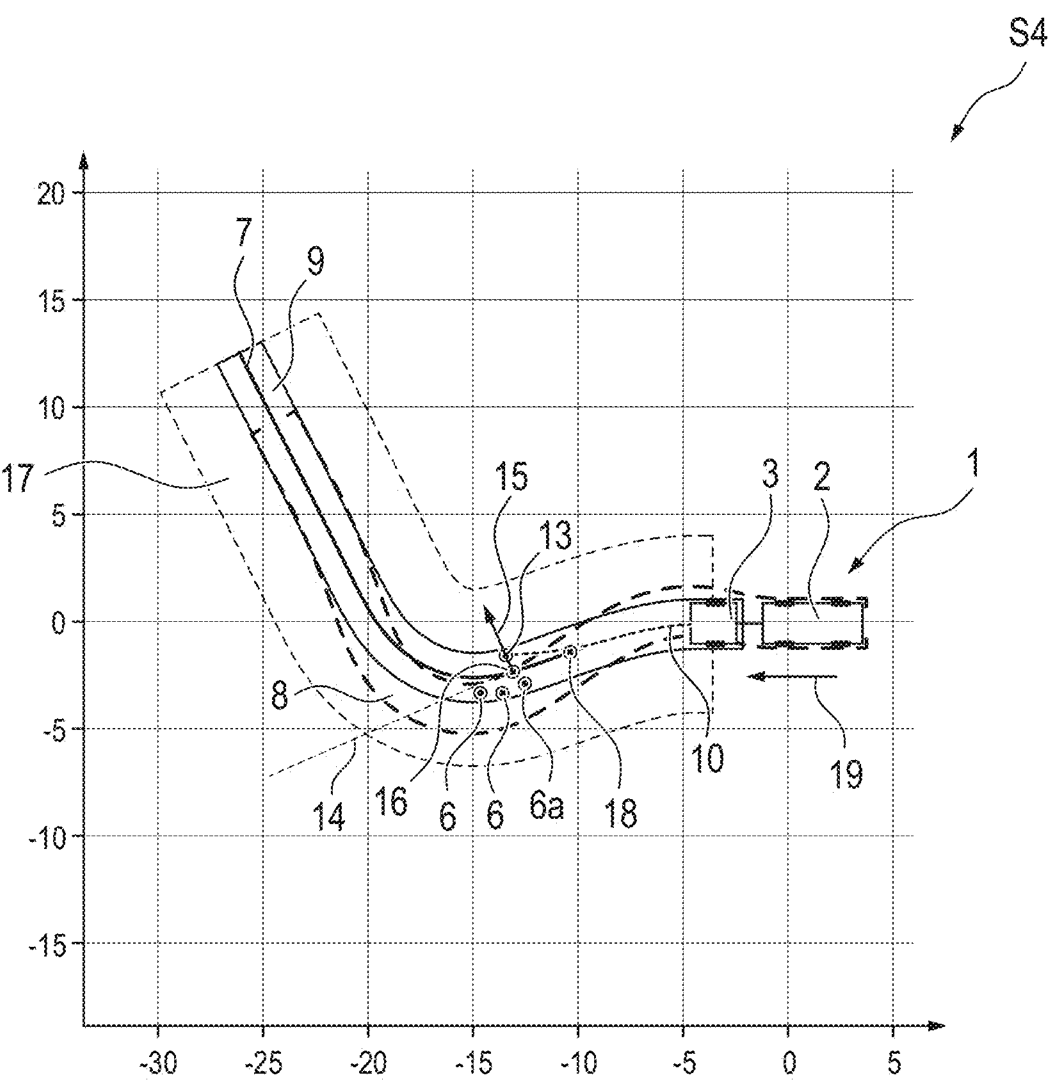
FIG. 4 shows a schematic plan view of the vehicle-trailer combination of FIG. 1, wherein departing from an initially planned reversing trajectory is planned.
Figure 5:
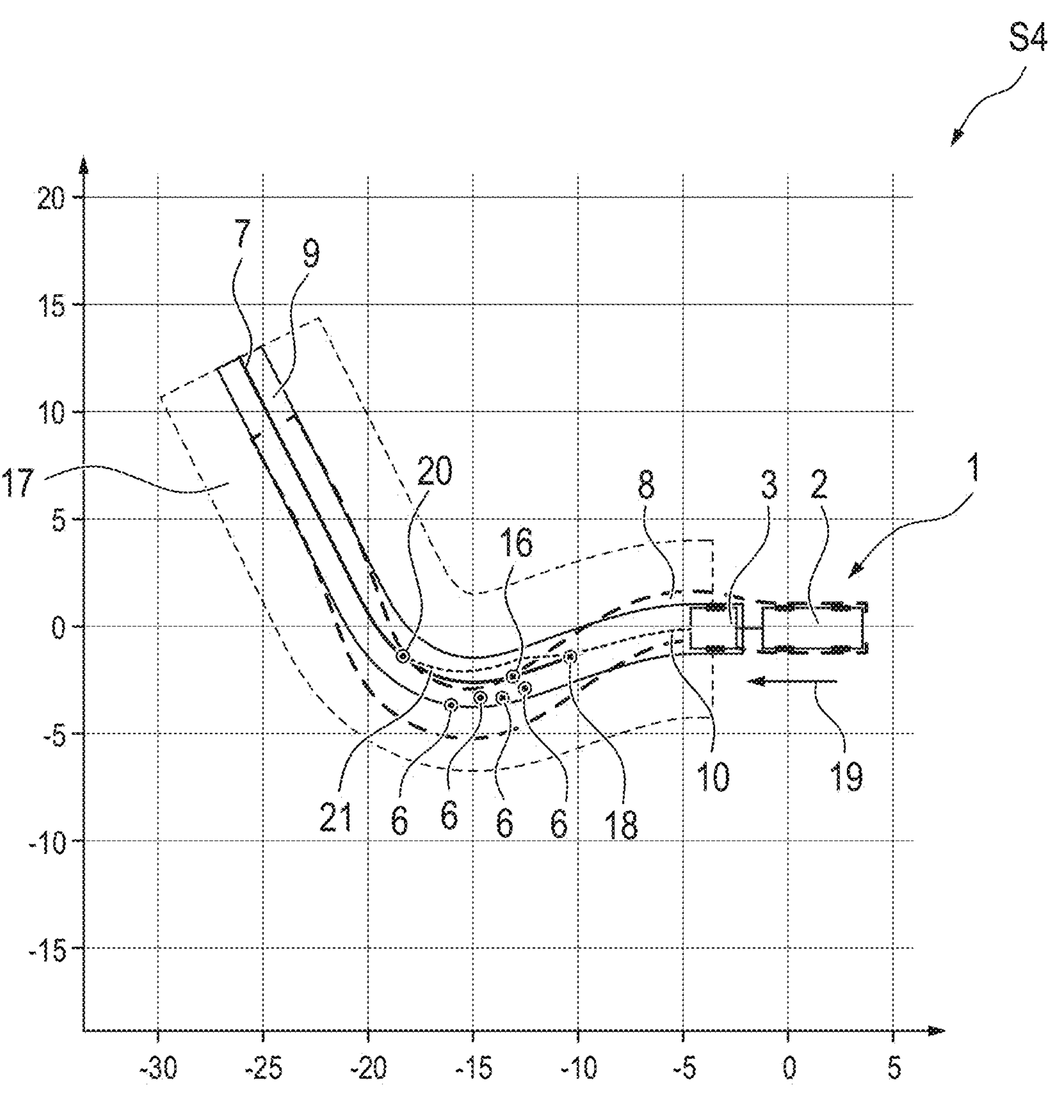
FIG. 5 shows a schematic plan view of the vehicle-trailer combination of FIG. 1, wherein returning to an initially planned reversing trajectory is planned.

FIG. 4 shows a schematic plan view of the trailer 1, wherein departing from the planned reversing trajectory 7 is planned, as a result of which a first new reversing trajectory portion 10 and, as a result, first new vehicle-specific reversing corridor portions 11, 12 (see FIG. 6) are planned for departing from the initially planned reversing trajectory 7. For this purpose, a problem point 13 lying on the reversing trajectory 7 initially planned in step S2 is determined, at which the reversing trajectory 7 and an outer contour point 6*a* of a collision object 6 are spaced part from each other by a minimum distance. Then a tangent 14 of the reversing trajectory 7 that branches off in the problem point 13 is determined. Then a perpendicular 15, which intersects the outer contour point 6*a*, to the tangent 14 is positioned. On a side of the reversing trajectory 7 lying opposite the outer contour point 6*a*, a new planning point 16 is then arranged as a straight-line extension of the perpendicular 15, wherein a trajectory offset distance is formed between the initially planned reversing trajectory 7 and the new planning point. Said distance is in any case greater than zero but is nevertheless selected such that it is as close as possible to the initially planned reversing trajectory 7. It is selected—at least during the first planning of the departure—at most as long as the driver assistance system assesses that it is possible in a first approximation for the trailer 1 to pass the problem point 13 without a collision. In particular, the trajectory offset distance is limited by a sensor range 17 of the sensor system of the towing vehicle 2, which sensor range is approximately four meters in each case perpendicular-laterally to the corresponding trajectory 4, 7, 7*a* that is driven with the towing vehicle 2. On the initially planned reversing trajectory 7, a departure point 18 is then determined, which lies, with reference to the reversing direction 19, before the problem point 13 on the initially planned reversing trajectory 7. In step S4, the first new reversing trajectory portion 10 and, as a result, for each vehicle 2, 3, the new vehicle-specific reversing corridor portions 11, 12 for departing from the initially planned reversing trajectory 7 are planned, in the example here by means of the reversing trajectory generation module, between the departure point 18 and the new planning point 16.

If it is determined when planning the new vehicle-specific reversing corridor portions 11, 12 or, respectively, the new reversing trajectory portion 10 for departing from the initially planned reversing trajectory 7 that driving these new reversing corridor portions 10, 11 would lead to a secondary collision, it is provided that planning the new vehicle-specific reversing corridor portions 11, 12 is restarted or, respectively, repeated. The repeated planning then takes place on the basis that the new planning point 16 is spaced apart from the initially planned reversing trajectory 7 by a greater trajectory offset distance than during the first pass in order to also avoid the secondary collision. Alternatively or additionally, the repeated planning takes places on the basis of a departure point 18 lying closer to the trailer 1.

In the present case, returning to the initially planned reversing trajectory 7 is also planned. For this purpose, on the initially planned reversing trajectory 7, a return point 20 is determined, which lies, with reference to the reversing direction 19, after the problem point 13 on the initially planned reversing trajectory 7. In step S4, a second new reversing trajectory portion 21 and, as a result, for each vehicle, a second new vehicle-specific reversing corridor portion 22, 23 for returning to the initially planned reversing trajectory 7 are planned, here by means of the reversing trajectory generation module, between the new planning point 16 and the return point 20.

If it is determined when planning the second new vehicle-specific reversing corridor portions 22, 23 or, respectively, the new reversing trajectory portion 21 for returning to the initially planned reversing trajectory 7 that driving these new reversing corridor portions 22, 23 would lead to a further/another secondary collision, it is provided that planning the second new vehicle-specific reversing corridor portions 22, 23 is restarted or, respectively, repeated. The repeated planning then takes place on the basis that a return point 20 lying farther away from the trailer 1 is determined. Alternatively or additionally, planning the departure from the initially planned reversing trajectory 7 is repeated as described above, wherein the new planning point 16 is shifted even farther toward an edge of the sensor range 17.

Figure 6:
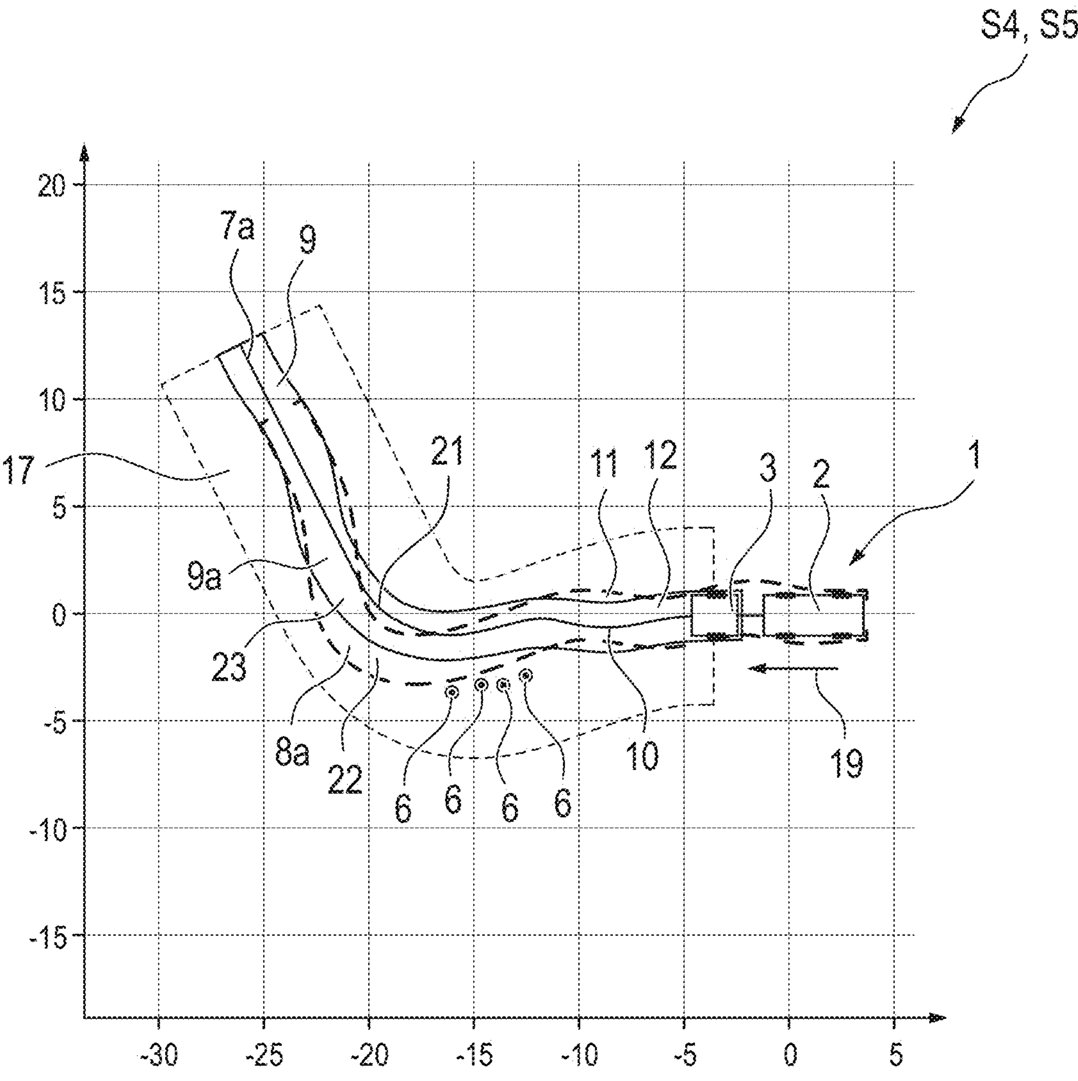
FIG. 6 shows a schematic plan view of the vehicle-trailer combination of FIG. 1, for which a collision-free reversing trajectory has been planned.

FIG. 6 shows a schematic plan view of the trailer 1, for which the collision-free, new reversing trajectory 7*a* is/has been planned. Based on the new reversing trajectory 7*a*, the trailer 1 is reversed in a reversing assistance operating mode with the aid of a vehicle control module of the driver assistance system, wherein the vehicle control module of the driver assistance system intervenes in transverse guidance of the towing vehicle 2 at least such that the trailer 1 is driven along the new reversing trajectory 7*a* having the new reversing trajectory portions 10, 21 and, as a result, through the new vehicle-specific reversing corridors 8*a*, 9*a*, which have the new reversing corridor portions 11, 12, 22, 23. In the present case, reversing by means of the driver assistance system is performed in one go, meaning without a forward correction, along the entire new reversing trajectory 7*a* and, as a result, through the new vehicle-specific reversing corridors 8*a*, 9*a*. To do so, the driver assistance system completely takes over the transverse guidance of the towing vehicle 2 and/or a longitudinal guidance of the towing vehicle 2 in step S5.

The departure from the initially planned reversing trajectory 7 and the return to the initially planned reversing trajectory 7 can be planned in advance for the entire initially planned reversing trajectory 7 before the driver assistance system or, respectively, its vehicle control module intervenes in the transverse guidance of the towing vehicle 2 for the first time. Alternatively, the departure from the initially planned reversing trajectory 7 is planned as soon as it is determined by means of the driver assistance system that a specified minimum planning distance between a current position of the trailer 1 and the problem point 13 has been reached. Returning to the initially planned reversing trajectory 7 is planned in this case when the trailer 1 is located on the first new reversing trajectory portion 10.

Once again with reference to FIG. 1 and FIG. 2, it will be explained that, according to the presently described example, a first imaginary collision rectangle 24 is specified to the driver assistance system for each vehicle 2, 3, which rectangle completely encloses the corresponding vehicle 2, 3 and moves along with the vehicle 2, 3. In the present case, the collision rectangle 24 is specified in each case such that an outer contour of the associated vehicle 2, 3 and the edges of the collision rectangle 24 are spaced apart from each other by a first safety distance of 25 cm. An imaginary circle 25 is also specified to the driver assistance system for each vehicle 2, 3, on which circle the vertices of the associated collision rectangle 24 always lie. It is also provided in the example that the detected objects 5 are each classified as a critical object if the corresponding object 5 has been intersected by one or both of the circles 25 when driving forwards. Then, in step S3 of the method, only those of the detected objects 5 that would be intersected by the collision rectangle 24 during reversing assisted by means of the driver assistance system are each classified, if applicable, as a collision object 6.

Optionally, a second imaginary collision rectangle, which lies completely within the first collision rectangle 24, and a third imaginary collision rectangle, which lies completely within the second collision rectangle, are specified for each vehicle 2, 3. In this case, the edges of the first collision rectangle 24 and the outer contour of the associated vehicle are then spaced apart from each other by the first safety distance, which is then 75 cm. The edges of the second collision rectangle and the edges of the first collision rectangle 24 are spaced apart from each other, for example, by 25 cm, as a result of which the edges of the second collision rectangle and the outer contour of the associated vehicle 2, 3 are spaced apart from each other by a second safety distance of 50 cm. Furthermore, the edges of the third collision rectangle and the edges of the second collision rectangle are spaced apart from each other, for example, by 25 cm, as a result of which the edges of the third collision rectangle and the outer contour of the associated vehicle 2, 3 are spaced apart from each other by a third safety distance of 25 cm. In this case, when reversing assisted by means of the driver assistance system, the collision object 6 in each case is classified as a notice object as long as the corresponding collision object 6 is intersected by the first collision rectangle 24 but not by the second collision rectangle or by the third collision rectangle. In response to the notice object, a notice action is performed by means of the driver assistance system. For example, it is communicated to the driver that the trailer 1 is approaching the collision object 6 and/or a driving speed of the trailer 1 is reduced and/or the complete or partial resumption of control of the trailer 1 is offered to the driver. Further, the collision object 6 in each case is classified during assisted reversing as a warning object as long as the corresponding collision object 6 is intersected by the first collision rectangle 24 and by the second collision rectangle but not by the third collision rectangle, wherein a warning action is performed by means of the driver assistance system in response to the warning object. For example, it is communicated to the driver that the trailer 1 is in danger of a collision and/or a driving speed of the trailer 1 is reduced further/more and/or the complete resumption of control of the trailer 1 is recommended to the driver with high urgency. If the collision object 6 enters the innermost of the collision rectangles, meaning the third collision rectangle, a collision emergency action can be performed. For example, it is communicated to the driver that a collision is immediately imminent and/or the trailer 1 is completely stopped and/or the control of the trailer 1 is once again given completely to the driver.

LIST OF REFERENCE NUMERALS

1 Trailer

2 Towing vehicle

3 Trailer vehicle
4 Forward trajectory of the trailer
**4*a*** Forward trajectory of the towing vehicle
**4*b*** Forward trajectory of the trailer vehicle
5 Object
6 Collision object
**6*a*** Outer contour point
7 Reversing trajectory of the trailer
**7*a*** New reversing trajectory
8 Reversing corridor of the towing vehicle
**8*a*** New reversing corridor of the towing vehicle
9 Reversing corridor of the trailer vehicle
**9*a*** New reversing corridor of the trailer vehicle
10 First new reversing trajectory portion
11 First new reversing corridor portion of the towing vehicle
12 First new reversing corridor portion of the trailer vehicle
13 Problem point
14 Tangent
15 Perpendicular
16 New planning point
17 Sensor range
18 Departure point
19 Reversing direction
20 Return point
21 Second new reversing trajectory portion
22 Second new reversing corridor portion of the towing vehicle
23 Second new reversing corridor portion of the trailer vehicle
24 First collision rectangle
25 Circle
S1-S5 Method step The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for assisted reversing with a trailer having a towing vehicle and a coupled trailer vehicle as well as a driver assistance system, wherein the trailer is initially driven forwards, comprising:

storing a corresponding forward trajectory in the driver assistance system;

detecting, using a sensor system of the towing vehicle, at least one object arranged laterally next to the forward trajectory;

planning the following:

a) a reversing trajectory, which deviates no more than a permissible limit deviation from the driven forward trajectory; and b) for each vehicle of the trailer, a vehicle-specific reversing corridor corresponding to the planned reversing trajectory;

classifying the detected at least one object as collision object if the at least one corresponding object lies in one or in both of the planned reversing corridors;

selectively generating, if one or more of the at least one detected object has been classified as a collision object, a new reversing trajectory and, as a result, for each vehicle a new vehicle-specific reversing corridor, which deviates no more than a permissible limit deviation from the reversing corridor planned, such that the collision object does not lie in either of the new vehicle-specific reversing corridors;

reversing the trailer with the aid of the driver assistance system, wherein the driver assistance system intervenes in transverse guidance of the towing vehicle at least such that the trailer is driven along the reversing trajectory or the new reversing trajectory, respectively, and, as a result, through the vehicle-specific reversing corridors or the new vehicle-specific reversing corridors, respectively, wherein a three-stage warning system is implemented, by means of which it is possible to more clearly inform a driver about potential risks, the three-stage warning system comprising:

defining, for each vehicle of the trailer, an imaginary collision rectangle, which rectangle completely encloses the corresponding vehicle and moves along with the vehicle:

defining, for each vehicle of the trailer, on which circle the vertices of the associated collision rectangle always lie;

the at least one detected object is classified as a critical object if the corresponding object has been intersected by one or both circles when driving forwards;

during classifying, only a critical object of the at least one detected object is classified, if applicable, as a collision object when the corresponding object would be intersected by the collision rectangle during reversing assisted by means of the driver assistance system; wherein for each vehicle, a second imaginary collision rectangle, which lies completely within the first collision rectangle, and t urd imaginary collision rectangle, which lies completely within the second collision rectangle, are defined, wherein, during reversing assisted by means of the driver assistance system, the collision object in each case;

is classified as a notice object as long as the corresponding collision object is intersected by the first collision rectangle but not by the second collision rectangle or by the third collision rectangle wherein a notice action is performed by means of the driver assistance system in response to the notice object;

is classified as a warning object as long as the corresponding collision object is intersected by the first collision rectangle and by the second collision rectangle but not by the third collision rectangle, wherein a warning action is performed by the driver assistance system in response to the warning object.

2. The method of claim 1, wherein reversing takes place in one go along the entire new reversing trajectory and, as a result, through the new vehicle-specific reversing corridors.

3. The method of claim 1, wherein during reversing, the driver assistance system completely takes over the transverse guidance of the towing vehicle and/or a longitudinal guidance of the towing vehicle.

4. The method of claim 1, wherein departing from the initially planned reversing trajectory is planned in that a perpendicular, which intersects an outer contour point, to the tangent of the reversing trajectory is positioned at a problem point of the reversing trajectory initially planned, at which the reversing trajectory and the outer contour point of a collision object are spaced apart from each other by a minimum distance, on a side of the reversing trajectory lying opposite the outer contour point and as a straight-line extension of the perpendicular, a new planning point is placed, wherein a trajectory offset distance is formed between the initially planned reversing trajectory and the new planning point, on the initially planned reversing trajectory, a departure point is determined, which lies, with reference to the reversing direction, before the problem point on the initially planned reversing trajectory, during generating, a new reversing trajectory portion and, as a result, for each vehicle, new vehicle-specific reversing corridor portions for departing from the initially planned reversing trajectory are planned between the departure point and the new planning point.

5. The method of claim 4, wherein returning to the initially planned reversing trajectory is planned in that on the initially planned reversing trajectory, a return point is determined, which lies, with reference to the reversing direction, after the problem point on the initially planned reversing trajectory, during generating, an additional new reversing trajectory portion and, as a result, for each vehicle, additional new vehicle-specific reversing corridor portions for returning to the initially planned reversing trajectory are planned between the new planning point and the return point.

6. The method of claim 4, wherein departing from the initially planned reversing trajectory and returning to the initially planned reversing trajectory is planned for the entire planned reversing trajectory before the driver assistance system intervenes in the transverse guidance of the towing vehicle for the first time, or departing from the initially planned reversing trajectory is planned as soon as it is determined using the driver assistance system that a specified minimum planning distance between a current position of the trailer and the problem point has been reached, and returning to the initially planned reversing trajectory is planned when the trailer is located on the new reversing trajectory portion.

7. A driver assistance system configured to perform a method for assisted reversing with a trailer having a towing vehicle and a coupled trailer vehicle as well as a driver assistance system, comprising:

storing a corresponding forward trajectory in the driver assistance system;

detecting, using a sensor system of the towing vehicle, at least one object arranged laterally next to the forward trajectory;

planning the following:

a) a reversing trajectory, which is substantially similar to the driven forward trajectory; and b) for each vehicle of the trailer, a vehicle-specific reversing corridor corresponding to the planned reversing trajectory;

classifying the detected at least one object as collision object if the at least one object lies in one or in both of the planned reversing corridors;

generating, if one or more of the at least one detected object has been classified as a collision object, a new reversing trajectory and, as a result, for each vehicle a new vehicle-specific reversing corridor, which deviates as little as possible from the reversing corridor planned, such that the collision object does not lie in either of the new vehicle-specific reversing corridors;

reversing the trailer with the aid of the driver assistance system, wherein the driver assistance system intervenes in transverse guidance of the towing vehicle at least such that the trailer is driven along the reversing trajectory or the new reversing trajectory, respectively, and, as a result, through the vehicle-specific reversing corridors or the new vehicle-specific reversing corridors, respectively, wherein a three stage warning system is implemented, by means of which it is possible to more clearly inform a driver about potential risks, the three-stage warning system comprising:

defining, for each vehicle of the trailer, an imaginary collision rectangle, which rectangle completely encloses the corresponding vehicle and moves along with the vehicle;

defining, for each vehicle of the trailer, on which circle the vertices of the associated collision rectangle always lie; wherein the at least one detected object is classified as a critical object if the corresponding object has been intersected by one or both circles when driving forwards:

during classifying, only a critical object of the at least one detected object is classified, if applicable, as a collision object when the corresponding object would be intersected by the collision rectangle during reversing assisted by means of the driver assistance system; wherein for each vehicle, a second imaginary collision rectangle, which lies completely within the first collision rectangle, and third imaginary collision rectangle, which lies completely within the second collision rectangle, are defined, wherein, during reversing, assisted by means of the driver assistance system, the collision object in each case;

is classified as a notice object as long as the corresponding collision object is intersected by the first collision rectangle but not by the second collision rectangle or by the third collision rectangle wherein a notice action is performed by means of the driver assistance system in response to the notice object;

is classified as a warning object as long as the corresponding collision object is intersected by the first collision rectangle and by the second collision rectangle but not by the third collision rectangle, wherein a warning action is performed by the driver assistance system in response to the warning object.

8. A motor vehicle with the driver assistance system of claim 7, wherein the motor vehicle is configured to function as the towing vehicle for the trailer.

9. The driver assistance system of claim 7, wherein reversing takes place in one go along the entire new reversing trajectory and, as a result, through the new vehicle-specific reversing corridors.

10. The driver assistance system of claim 7, wherein during reversing, the driver assistance system completely takes over the transverse guidance of the towing vehicle and/or a longitudinal guidance of the towing vehicle.

11. The driver assistance system of claim 7, wherein departing from the initially planned reversing trajectory is planned in that a perpendicular, which intersects an outer contour point, to the tangent of the reversing trajectory is positioned at a problem point of the reversing trajectory initially planned, at which the reversing trajectory and the outer contour point of a collision object are spaced apart from each other by a minimum distance, on a side of the reversing trajectory lying opposite the outer contour point and as a straight-line extension of the perpendicular, a new planning point is placed, wherein a trajectory offset distance is formed between the initially planned reversing trajectory and the new planning point, on the initially planned reversing trajectory, a departure point is determined, which lies, with reference to the reversing direction, before the problem point on the initially planned reversing trajectory, during generating, a new reversing trajectory portion and, as a result, for each vehicle, new vehicle-specific reversing corridor portions for departing from the initially planned reversing trajectory are planned between the departure point and the new planning point.

12. The driver assistance system of claim 11, wherein returning to the initially planned reversing trajectory is planned in that on the initially planned reversing trajectory, a return point is determined, which lies, with reference to the reversing direction, after the problem point on the initially planned reversing trajectory, during generating, an additional new reversing trajectory portion and, as a result, for each vehicle, additional new vehicle-specific reversing corridor portions for returning to the initially planned reversing trajectory are planned between the new planning point and the return point.

13. The driver assistance system of claim 11, wherein departing from the initially planned reversing trajectory and returning to the initially planned reversing trajectory is planned for the entire planned reversing trajectory before the driver assistance system intervenes in the transverse guidance of the towing vehicle for the first time, or departing from the initially planned reversing trajectory is planned as soon as it is determined using the driver assistance system that a specified minimum planning distance between a current position of the trailer and the problem point has been reached, and returning to the initially planned reversing trajectory is planned when the trailer is located on the new reversing trajectory portion.

14. The driver assistance system of claim 12, wherein departing from the initially planned reversing trajectory and returning to the initially planned reversing trajectory is planned for the entire planned reversing trajectory before the driver assistance system intervenes in the transverse guidance of the towing vehicle for the first time, or departing from the initially planned reversing trajectory is planned as soon as it is determined using the driver assistance system that a specified minimum planning distance between a current position of the trailer and the problem point has been reached, and returning to the initially planned reversing trajectory is planned when the trailer is located on the new reversing trajectory portion.

15. The method of claim 5, wherein departing from the initially planned reversing trajectory and returning to the initially planned reversing trajectory is planned for the entire planned reversing trajectory before the driver assistance system intervenes in the transverse guidance of the towing vehicle for the first time, or departing from the initially planned reversing trajectory is planned as soon as it is determined using the driver assistance system that a specified minimum planning distance between a current position of the trailer and the problem point has been reached, and returning to the initially planned reversing trajectory is planned when the trailer is located on the new reversing trajectory portion.

* * * * *